Feb. 3, 1970 — A. B. BRADEN, JR., ET AL — 3,493,728
CARD FEED MECHANISM FOR A HIGH-SPEED CARD READER
Filed Dec. 19, 1966 — 5 Sheets-Sheet 1
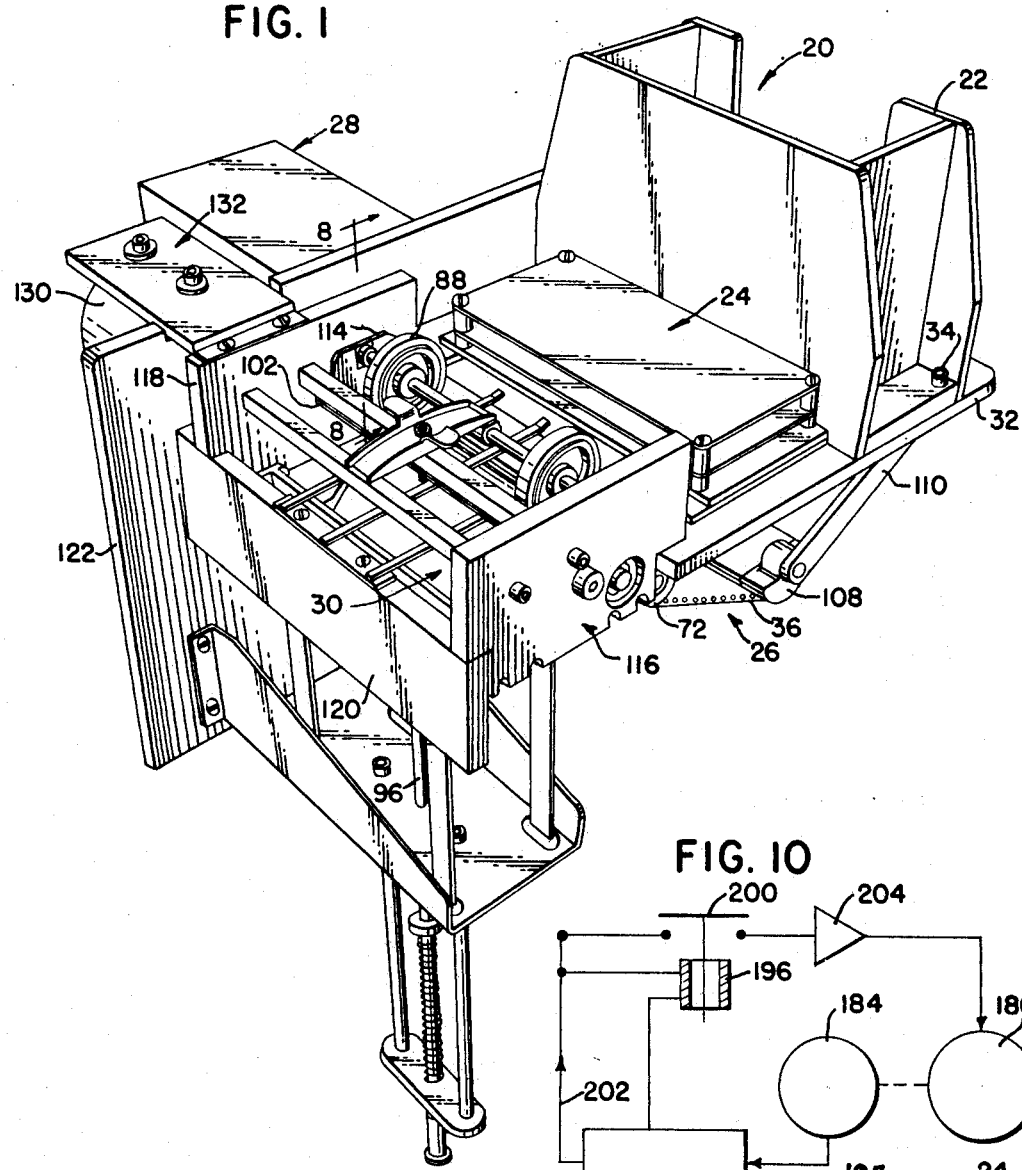
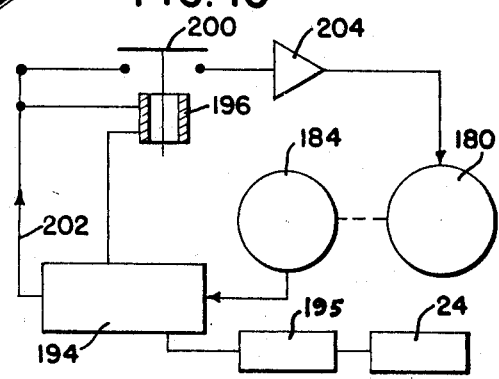
INVENTORS
ARTHUR B. BRADEN, JR. &
FRANK J. ROELANDT
BY Louis A. Kline
Elmer J. Wargo
THEIR ATTORNEYS

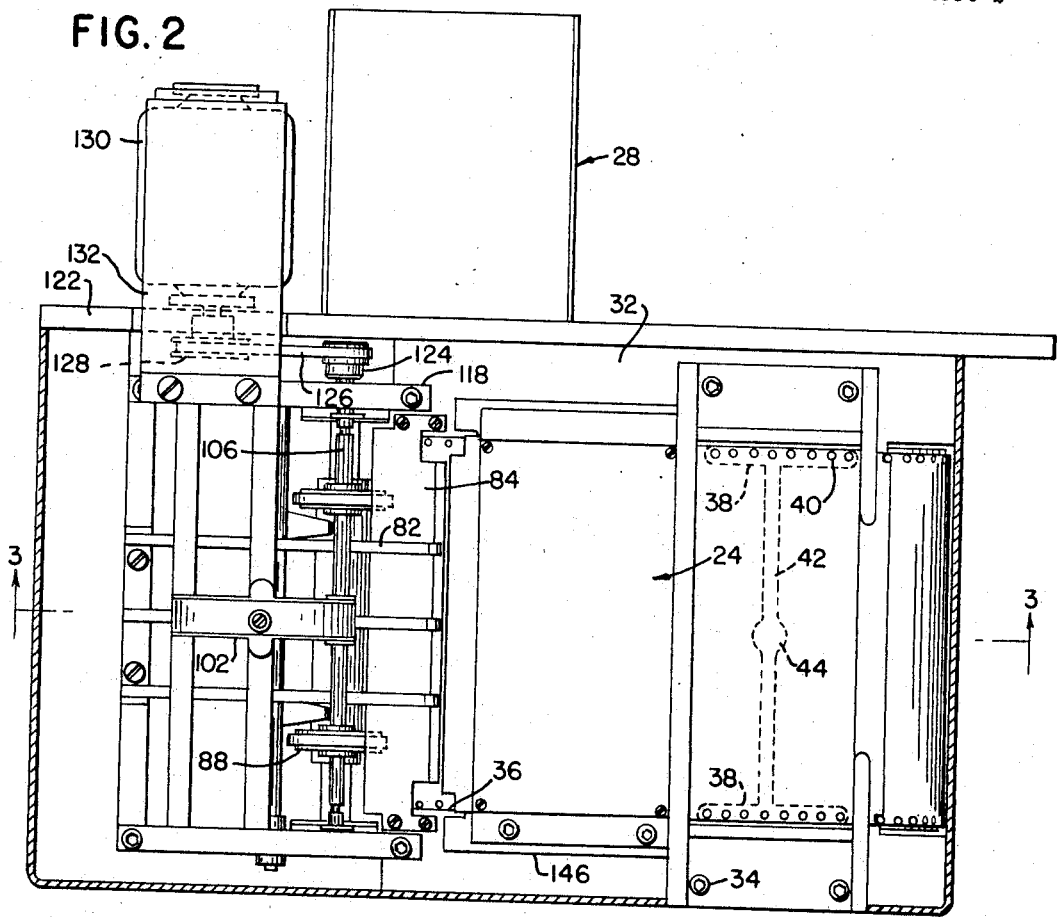
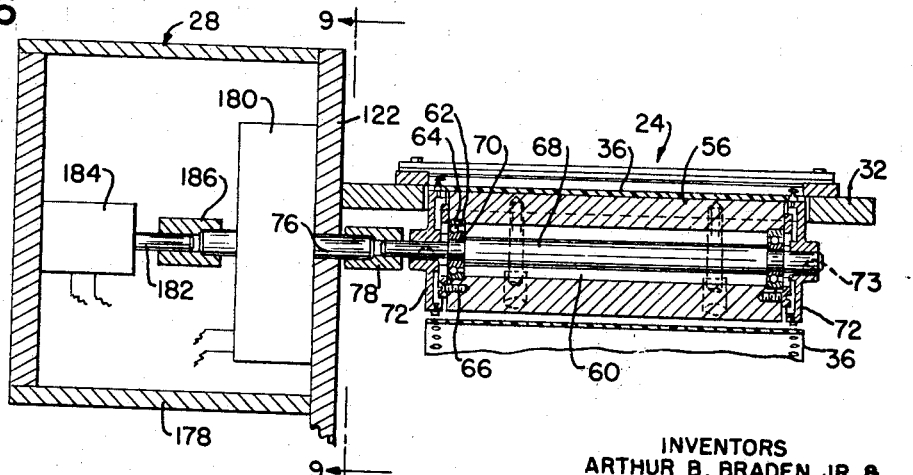

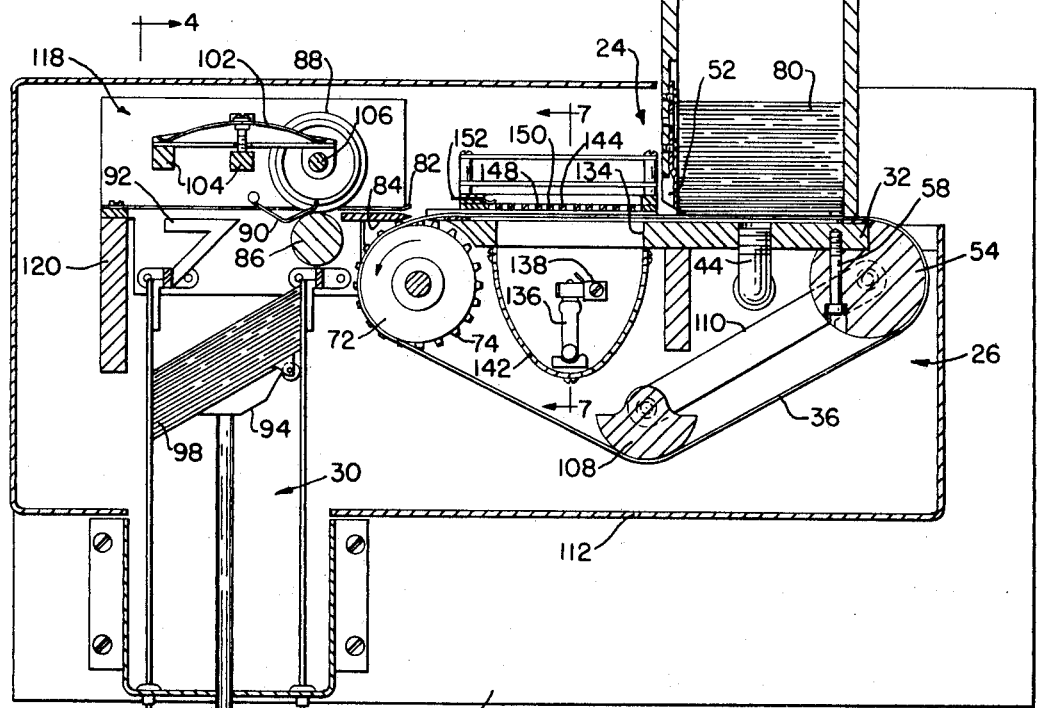
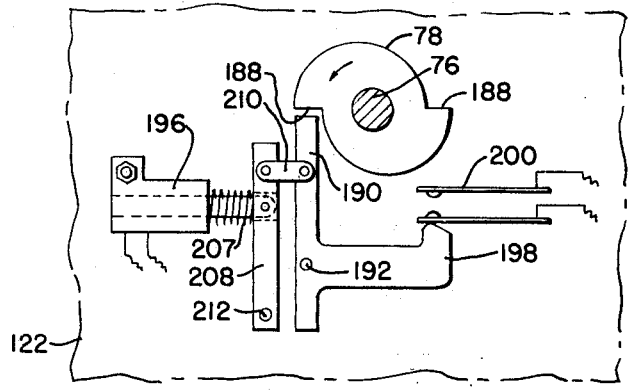

INVENTORS
ARTHUR B. BRADEN, JR. &
FRANK J. ROELANDT

BY *Louis A. Kline*
*Elmer Vargo*

THEIR ATTORNEYS

INVENTORS
ARTHUR B. BRADEN, JR. &
FRANK J. ROELANDT
BY Louis A. Kline
Elmer Wargo
THEIR ATTORNEYS

United States Patent Office 3,493,728
Patented Feb. 3, 1970

3,493,728
CARD FEED MECHANISM FOR A HIGH-SPEED CARD READER
Arthur B. Braden, Jr., and Frank J. Roelandt, Dayton, Ohio, assignors to The National Cash Register Company, Dayton, Ohio, a corporation of Maryland
Filed Dec. 19, 1966, Ser. No. 602,738
Int. Cl. G06k 7/00
U.S. Cl. 235—61.11                          11 Claims

ABSTRACT OF THE DISCLOSURE

A card feed mechanism uses a transparent feed band to transfer cards from a feed hopper to a reading station, where the cards are momentarily stopped to be read by light-responsive means. A printed circuit motor is used to intermittently drive the feed band, which may also be made from metal which is punched to permit light to pass through it and through the holes in the punched card to the reading station.

---

This invention relates to input data equipment, and more particularly it relates to a card feed mechanism employed in an input data machine such as a high-speed punched card reader which provides input data to a computer system.

Recent developments in electronic digital computers have greatly increased the speeds at which the computers perform their internal operations. Often, the total computation time is governed and limited by the rate at which input data is fed into the computer. While magnetic tapes and drum inputs have facilitated the entry of data into the computer system, much of the data fed into such systems is still in the form of punched tabulating cards.

In an effort to reduce the time during which the computer must wait for input data to be fed to it from punched cards, the card feed mechanism of the present invention was developed so that cards could most effectively be fed to a read station where, upon proper command from the computer, all of the data in the card could be simultaneously read and fed to the computer. By this construction, the time for feeding the input data to the computer is greatly reduced over the existing punched card readers which employ sensing means which serially read rows of information from the punched cards as they are moved thereby. However, when all the data in the card is being read at once, special problems arise in the handling of the cards because each card must be fed to a reading station where all of the data in the card is in reading relationship therewith, and then the card is momentarily stopped during the actual reading period. Reading all the data in the card at once enables the data to be rearranged, if necessary, at the time it is fed into the computer without the use of complicated intermediate storage devices such as buffer registers.

The card feed mechanism of the present invention utilizes a conveyor-like endless feed band which is movably supported and intermittently driven in one direction under a card feed hopper. The feed band is provided with picker knives which are so dimensioned as to engage only the bottom card in the hopper and are spaced along the feed band so as to receive the card between two adjacent picker knives and move it to the reading station.

The feed band is driven by drive means which subject each card to a gradual acceleration when the card is removed from the card feed hopper and a gradual deceleration as the card is momentarily brought to a stop at the reading station, where the data contained therein is read. The drive means to drive the feed band produce the required intermittent rotary motion.

Accordingly, a primary object of this invention is to produce a high-speed card fed mechanism which is especially adaptable for transporting punched cards from a feed hopper to an operative station such as a reading station, at which station the cards are precisely and momentarily stopped to be read and are subsequently moved to a stacker pocket.

Another object of this invention is to provide a high-speed card feed mechanism which is especially adaptable for transporting punched cards from a hopper to a reading station which provides input data to a computer system, the reading station being such as to read all the information in the card simultaneously, so as to minimize the time during which the computer is detained in receiving such information.

Another object of this invention is to provide a high-speed card feed mechanism which transports the punched cards from a feed hopper to an operative station while subjecting the cards to a minimum of extreme accelerating and decelerating forces.

A still further object is to provide a high-speed card feed mechanism which is especially adaptable for use in a card reader which utilizes light-responsive means at the reading station to simultaneously read all the information in the card being read.

These and other objects and advantages of this invention will become more readily understood in connection with the following description and the drawings, in which:

FIG. 1 is a perspective view of the card fed mechanism of this invention showing, generally, the card feed hopper, the read station, the conveyor for transporting cards to the reading station, the drive mechanism for driving the conveyor, and the stacker pocket for receiving cards which have been read;

FIG. 2 is a plan view of the top of the card feed mechanism shown in FIG. 1;

FIG. 3 is a cross-sectional view in elevation taken along the line 3—3 of FIG. 2 and showing details of the feed hopper, the reading station, and the conveyor;

FIG. 6 is an elevational view, partly in section and taken along the line 6—6 of FIG. 5, showing details of the means for mounting and driving the feed band;

FIG. 9 is an elevational view, partly in section and taken along the line 9—9 of FIG. 6, showing details of the pawl means used for stopping the conveyor so as to accurately position a card carried thereby under the reading station; and FIG. 10 is a block diagram showing a general circuit arrangement for operating the drive means.

FIG. 1 is a perspective view of the card feed mechanism of this invention, which is generally designated 20.

Figure 4:
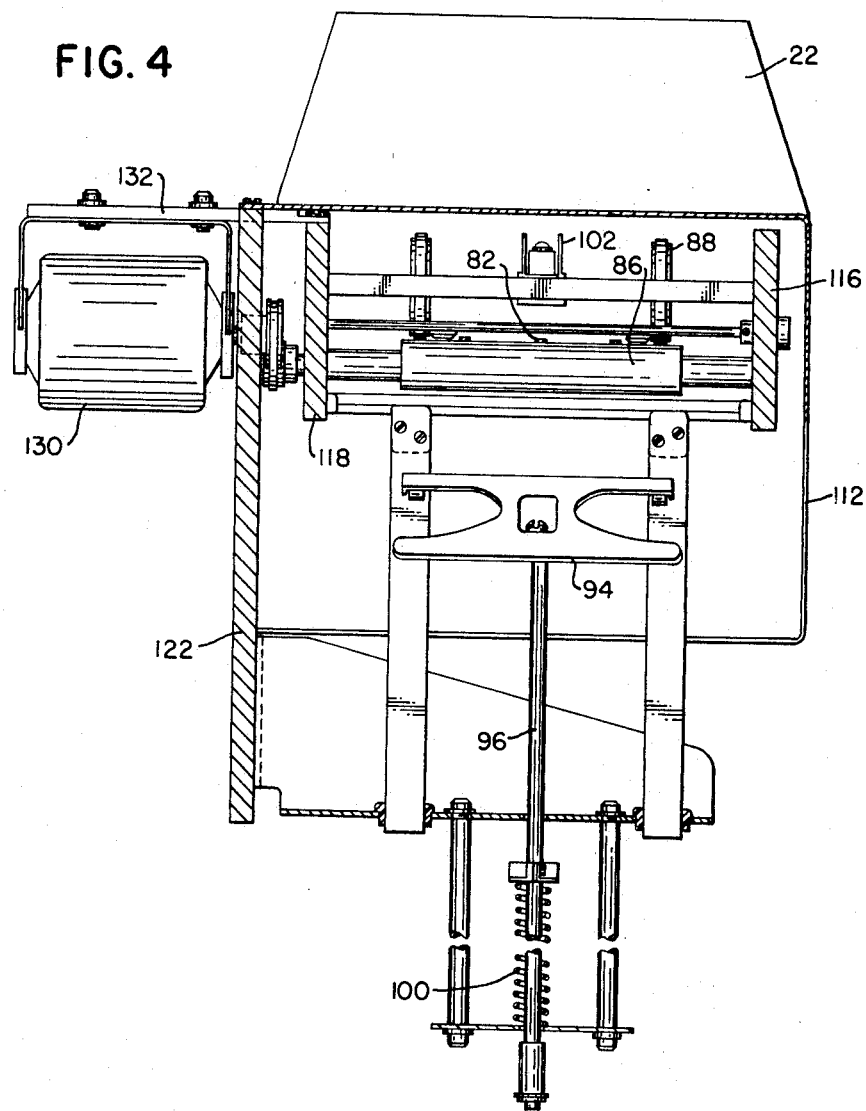
FIG. 4 is a cross-sectional view in elevation taken along the line 4—4 of FIG. 3 and showing details of the stacker pocket for receiving the cards from the reading station, the reading head at the reading station, and the conveyor belt.

The card feed mechanism is composed of several basic elements, which are the card input feed hopper 22, the reading station 24, the conveyor means 26 for delivering the cards to be read from the hopper 22 to and from the reading station 24, the drive mechanism 28 for driving the conveyor, and the card receiving pocket means 30 for receiving the cards from the reading station 24.

The card feed hopper 22 is of standard size to receive standard punched tabulating cards, and the hopper is secured to the feed table 32 by fasteners 34, as seen in FIGS. 1 and 2. There is sufficient clearance between the bottom of the hopper 22 and the feed table 32 to permit the feed band 36 to pass therebetween while carrying a card.

The feed table 32 is provided with a pair of spaced parallel grooves 38 (FIG. 2), which are aligned with the sprocket driving holes 40 in the feed band 36, so that they will pass thereover. Another groove 42 in the feed table 32 interconnects the parallel grooves 38 and is connected to a vacuum line 44, shown in FIG. 3, which in turn is connected to a source of vacuum (not shown). When cards are placed in the hopper 22, the lowest card in the hopper is brought into close contact with the feed band 36 due to the withdrawal of air through the holes 40, which provides contact-producing forces in addition to the weight of the cards above the lowest one.

Figure 5:
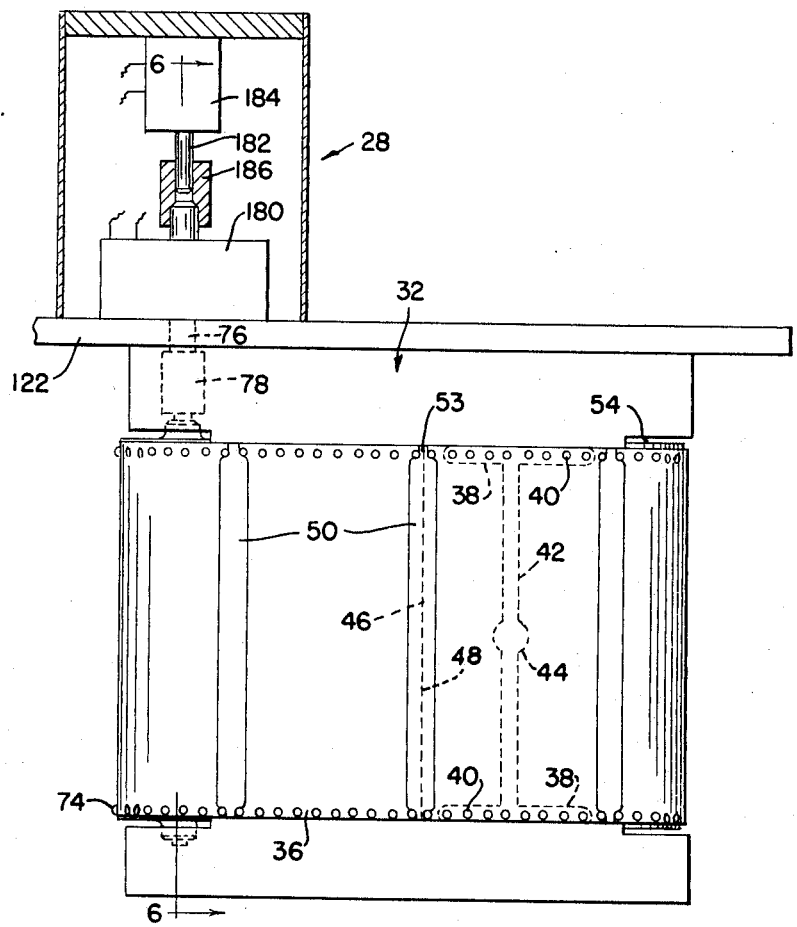
FIG. 5 is a plan view of the top of the card feed mechanism showing one embodiment of the driving means for driving the conveyor, and also showing the reading station; the card feed hopper being omitted from this drawing to show the picker blades on the conveyor.

The feed band 36 is best shown in FIG. 5, from which the reading station 24 and the feed hopper 22 are omitted to facilitate the showing of the feed band 36. In one embodiment, the feed band 36 itself is made of a transparent, flexible, durable plastic, such as Mylar, and is perforated along its lateral edges to provide aligned, spaced, driving sprocket holes 40. The feed band 36 may be made from a strip having its ends 46 and 48 abutting under a picker blade 50.

The picker blades 50 are mounted in spaced parallel relationship on the feed band 36 at right angles to its lateral edges, so as to receive the width of a standard tabulating card between any two adjacent picker blades 50. These blades may also be made of plastic or Mylar when the belt itself is made of such material, and they are secured to the feed band 36 by suitable adhesives.

The blades 50 have a thickness which is less than the thickness of a tabulating card to insure that only one card will be taken from the lower side of the feed hopper 22 when the feed band 36 passes thereunder. The side of the hopper 22 which is adjacent to the reading station 24 is provided with a suitable, adjustable, throat-knife mechanism, designated generally as 52 (FIG. 3), which permits only one card at a time to be taken from the hopper via the feed band 36. The picker blades 50 for the feed band 36 are notched at 53 (FIG. 5) to provide clearance for the tines 74 (FIG. 3) of the driving sprocket 72, which pass through the holes 40.

FIGS. 2, 3, 5, and 6 show the means for mounting the feed band 36 in the card feed mechanism 20. In order to eliminate some of the inertia of the mechanism, the feed band 36 is mounted to slide over stationary cylinders 54 (FIG. 3) and 56 (FIG. 6), which are secured to the feed table 32 by screws 58, as shown in FIG. 3. The cylinder 54 extends the full width of the feed band 36, as shown in FIG. 5; however, the cylinder 56, as shown in FIG. 6, does not extend across the full width of the feed band 36 but is made shorter to accommodate the driving sprockets 72, as will be explained later.

The cylinder 56, shown in FIG. 6, has a hole 60 extending axially therethrough, and at each of the extremities of the hole 60 the cylinder 56 is provided with an annular shoulder 62, against which a suitable bearing and support member 64 abuts. The member 64 is secured to the cylinder 56 by screws 66 to concentrically support a shaft 68 for rotation in the hole 60. The outer extremities of the shaft 68 are smaller in diameter than its central portion to provide shoulders 70, which abut against the pertaining bearing and support members 64 to thereby restrain the shaft 68 against axial movement in the cylinder 56.

The driving sprockets 72 are secured to the reduced diameter portions of the shaft 68 outwardly of the bearing and support members 64 by suitable keys 74. These sprockets 72 are spaced apart on the shaft 68 to enable the tines 74 on the sprockets 72 to enter the sprocket driving holes 40 on the feed band 36 in driving engagement therewith.

One end of the shaft 68 is detachably secured to an output shaft 76 (FIGS. 5 and 6) by a connector 78. The output shaft 76 is driven by the drive mechanism 28, which will be discussed in detail later. The drive mechanism 28 is effective to deliver intermittent rotary motion to the output shaft 76, which in turn drives the feed band 36.

The driving sprockets 72 rotate counter-clockwise (as viewed in FIG. 3) to move the feed band 36 under the feed hopper 22, where the lowest card of a stack of cards 80 is forced onto the band between a pair of adjacent picker blades 50. As the feed band 36 moves, the card just removed from the hopper 22 is moved to the reading station 24. The drive mechanism 28, which rotates the sprockets 72 to move the feed band 36, is also effective to move the feed band at a variable speed and also to cause the band to dwell, so that the card removed from the hopper 22 on the feed band 36 stops momentarily under the reading station 24, where it is read.

The reading station 24 utilizes photoelectric means to simultaneously read all colums and data in the punched card which is waiting momentarily under the read station to be read upon a signal from the computer or other device which is to receive the data. Usually, the computer or other device which receives the data operates at such high speeds that it is always ready to receive the data from the cards, and, therefore, the feed band 36 can operate continuously, repeating the process of positioning and momentarily stopping the card under the reading station 24. The card feed mechanism is effective to feed cards at rates of up to approximately 1,200 cards per minute. After being read, the card is moved from the reading station 24 by the feed band 36 to the card-receiving pocket 30, where the cards which have been read are collected.

The receiving pocket 30, shown principally in FIG. 3, is of standard construction and includes the usual deflector fingers 82 and deflector plate 84, which guide the card between the feed roller 86 and discs 88. Upon leaving the feed roller 86 and the discs 88, the card passes a deflector 90 and a pocket card guide 92, which direct the cards downwardly, where they come to rest upon the card reception plate 94, which is supported on a plate support tube 96. As the load of cards 98 on the plate 94 increases, the plate support tube 96 descends to compress a spring 100. A pressure bridge 102, mounted on cross bars 104 and a shaft 106, on which the discs 88 are mounted, varies the contact pressure of the discs 88 on the feed roller 86, between which the cards are fed.

Tension on the feed band 36 is obtained through use of a weight 108 (FIG. 3), which has an arcuate surface in sliding contact with substantially the entire width of the feed band 36. The weight 108 is supported by two arms 110 (only one of which is shown in FIG. 3), which arms are pivotally secured at their lower ends to opposed sides of the weight 108. The upper ends of the arms 110 are pivotally secured to opposed sides of the stationary cylinder 54.

The shaft 106 and the feed roller 86, shown in FIG. 3, are rotatably supported in suitable bearings 114 (FIG. 1), which are secured to front and rear frame support plates 116 and 118, respectively, which in turn are secured to a side plate 120 (FIG. 1), which is secured to a rear wall plate 122.

The discs 88 are fixed to rotate with the shaft 106, which has a drive pulley 124 fixed to one end thereof, as shown in FIG. 2. A suitable belt 126 drivingly connects the pulley 128 of a motor 130 with the drive pulley 124 to rotate the discs 88. A mounting plate 132 is used to secure the motor 130 to the rear wall plate 122 and the frame rear plate 118.

Figure 7:
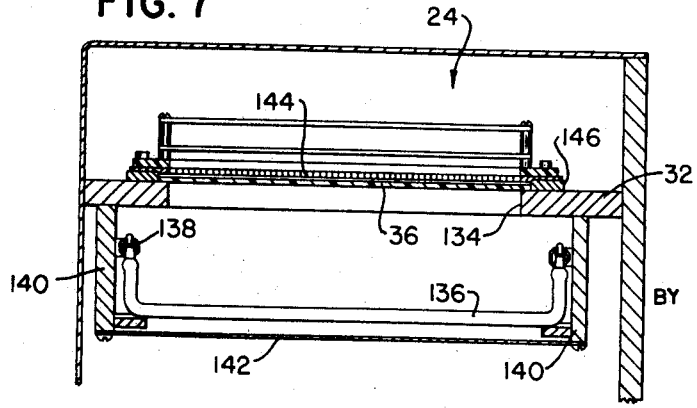
FIG. 7 is an elevational view, partly in section and taken along the line 9—9 of FIG. 3, showing details of the reading station.

The details of the reading station 24 using light-responsive means are shown in FIGS. 3 and 7. The feed table 32 is provided with an opening 134, through which light from the flash tube 136 may pass when the flash tube is energized. The flash tube 136 is secured in position by mounting brackets 138, which are fastened to the supports 140 (FIG. 7) depending from the feed table 32. A suitable light shield 142 is used to confine the light within the opening 134. The flash tube 136 is of the xenon type, which is similar to a strobe light, and is energized by suitable external circuitry connected with the computer or device to which the data in the cards is fed.

At the time that the flash tube 136 is energized, a punched card bearing the information to be read is positioned over the opening 134 in proper registration with the read head 144. Suitable guides 146 (FIG. 7) are secured to the feed table 32 to maintain the card to be read and the feed band 36 in proper registration with the read head 144 in the direction of the width of the feed band 36. The card being read is maintained on the feed band 36 between two adjacent picker blades 50, and the drive mechanism 28 is effective to position the card to be read in proper registration with the read head 144 along the length of the feed band 36.

With the card on the feed band 36 in proper registration with the read head 144, and with a signal from the computer, the flash tube 136 is energized, and light therefrom passes up through the opening 134 in the feed table, through the punched holes in the card being read, and to the read head 144.

The read head 144 is made of a layer of glass which is opaque to light except for a plurailty of window areas which permit light to pass therethrough. These window areas 148 are arranged in the read head 144 in an array which is identical to the array or rows and columns of areas available for punching in a standard tabulating card. When a punched card is positioned in proper registration under the read head 144, and the flash tube is energized, light passes through the feed band 36, through the holes in the punched card, and through the pertaining window areas 148 in the read head 144. Each window is provided with a photo-responsive means which can generate a signal when light is received thereby.

In the embodiment shown, the side of the read head 144 which is opposite to the card being read has a thin layer of photoconductive material thereon. This photoconductive material is formed into discrete areas 150 (FIG. 3), one such area covering each window area 148 of the read head 144. Contact leads such as 152 are used to individually connect each such discrete area 150 with the computer or external device to which the information is fed. Thus, when a hole is present in the card being read, the light passes through the feed band 36, the pertaining hole in the card, and the pertaining window area 148 to the particular discrete area 150 of photoconductive material to generate an electrical signal therein. By this arrangement, all the holes in the card are simultaneously read to produce individual signals for each hole appearing therein.

The flash tube 136 may be provided with a filter (not shown) to remove infrared light from the tube's output, as the usual punched tabulating card is rather transparent to infrared light, which degrades the signal-to-noise ratio of the electrical output of the photo-responsive read head. Instead of the xenon flash tube 136, a source of ultraviolet light (not shown) may be used, as the tabulating card is more opaque to ultraviolet light than it is to infrared light.

Figure 8:
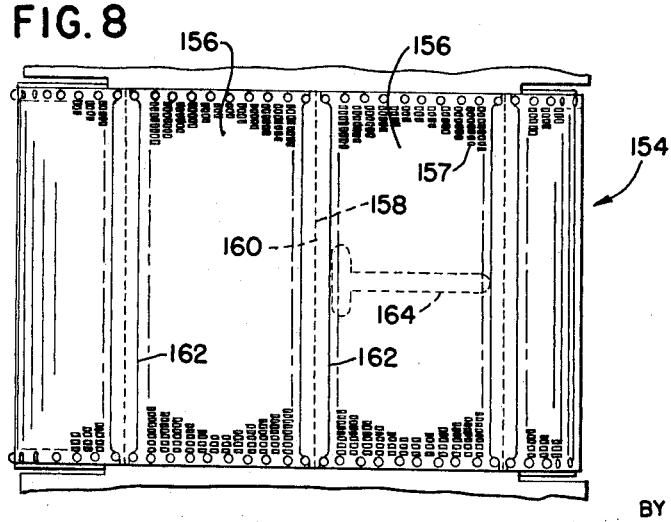
FIG. 8 is a plan view similar to FIG. 5 of another modification of the conveyor belt of this invention, showing a belt formed of a plurality of sections joined together, each section having an array of holes therein which are in registration with the holes of a fully-punched tabulating card when the card is placed thereon.

FIG. 8 shows another embodiment of the feed band used in this invention, in which the belt, designated generally as 154, is made from a metal, such as stainless steel, which is approximately .003 inch thick. The belt 154 is made of a plurality of sections 156, which have therein holes 157, which are formed in the pattern of a fully-punched tabulating card with which the band 154 will be used. The individual adjacent sections 156 have their joining edges 158 and 160 secured to a common picker blade 162, which performs the dual function of joining the sections 156 and also of acting as picker blades for transporting the punched cards.

When the belt 154 is used, the feed table 32 is provided with a groove 164 (FIG. 8), which is located centrally of the belt passing thereover. The groove 164 communicates with the vacuum line 44 (shown in FIG. 3) to assist in the transfer of cards from the feed hopper 22 to the belt 154.

When a card is being fed at high feeding rates to the reading station 24, it is desirable to subject the card carried by the feed band to a minimum of abrupt changes in the velocity. A direct current, printed circuit armature, permanent magnet motor was selected from the drive means 28 to drive the feed band, because of its low inertia, its high-pulse torque capability, and its ability to produce smooth, controlled accelerations, velocities, and accurate displacements. Since the printed circuit motor inherently has no preferred armature position, it may be coupled directly to the sprocket shaft 68 (FIG. 6), thereby eliminating the need for intermediate gears, transmission, or clutches.

The printed circuit motor 180 (FIG. 6) is conventional, is mounted on the rear wall plate 122, from which one end of the output shaft 76 extends, and is coupled directly to the sprocket shaft 68 by the connector 78. The remaining end of the shaft 76 is secured to a shaft 182 (via a coupling 186) of a tachometer generator 184, which forms a part of conventional circuitry for controlling the stepping or intermittent rotary motion of the motor 180.

The diameter of the driving sprocket 72 was selected to make the load inertia approximately equal to the motor rotor inertia, and then it was adjusted so that a whole number of feeding operations could be obtained for each complete revolution of the motor rotor. In the specific embodiment illustrated in the drawings, two feeding operations were obtained for each complete rotation of the motor rotor.

In order to insure accurate locating of the card being read, positioning detents are used, as shown in FIG. 9. The coupling 78 is provided with two detents 188, which are located 180 degrees apart thereon and are adapted to abut against a pawl 190, which is pivotally mounted on a pin 192, which is anchored to the plate 122. When a detent of the connector 78 abuts against the pawl 190, the driving sprockets 72 and the feed band 36 are effective to position a card being read in registration with the read head 24.

Upon a signal from a computer or other utilization device with which this card feed mechanism is used, the card at the read station is read, and the pawl 190 is pivoted counter-clockwise (as viewed in FIG. 9), enabling the printed circuit motor 180 to rotate the drive sprockets 72 counter-clockwise (as shown in FIG. 3). The feed band 36 then removes the card just read and advances the next card to be read towards the reading station 24. As the next card to be read approaches the reading station 24, the motor 180, which advanced the feed band 36, is now used to brake or decelerate it. The feed band 36 is decelerated sufficiently by the motor 180 to enable the approaching detent on the connector 78 to abut against the pawl 190 without damage to the abutting parts and thereby position the next card to be read at the reading station 24, where this card remains until the next read signal is received.

Control of the printed circuit motor 180 is accomplished by conventional circuitry 194, shown only in block form in FIG. 10. There are four general basic functions which the control circuitry 194 accomplishes; namely, forward drive, braking, detent hold, and card jam detection.

When the feed signal is received in the control circuitry 194, the forward drive is begun by energization of the solenoid 196 (FIGS. 9 and 10), which disengages the pawl 190 from the pertaining detent 188, as previously explained. When the pawl 190 is pivoted completely out of the way of the detents 188, a leg 198 (FIG. 9) on the pawl closes the normally open switch 200, thereby completing a circuit (over the conductor 202) from the control circuitry 194 to a conventional drive amplifier 204, which applies a forward drive current to the motor 180.

The duration of time that the forward drive current is applied to the motor 180 varies with changes in the frictional loading on the feed band 36, which changes are due to varying amounts of cards in the feed hopper 22. To prevent undesirable time and displacement variations due to a fixed time duration drive current, the forward drive current to the motor 180 is terminated by velocity sensing.

Velocity sensing of the motor 180 is achieved by sampling the output of the tachometer generator 184 (FIGS. 6 and 9), which is rotated by the motor 180. The said output is fed to a conventional Schmitt trigger circuit (not shown), which is used to generate a termination pulse when the generator 184 develops a predetermined output.

The termination pulse mentioned is effective to terminate the forward drive current and initiate a current reversal (that is, a braking current) to the motor 180, thereby braking the motor and causing its speed to drop. When the motor speed drops to a predetermined level, the braking current supplied thereto is terminated by conventional velocity-sensing circuitry, as was done in terminating the forward drive current. At this time, the solenoid 196 is deenergized, and the pawl 190 is urged clockwise (as viewed in FIG. 9) by a spring 207 and conventional levers 208 and 210 operatively associated with said solenoid. As the connector 78 rotates counterclockwise, the approaching detent 188 thereon abuts against the pawl 190 to thereby stop and position the next card to be read under the reading station 24.

When the braking current is terminated by the velocity-sensing circuitry mentioned above, a small holding current is applied to the motor 180, tending to drive the motor in the same direction as does the forward drive current. The holding current insures accurate seating of the detent 188 against the pawl 190, which in turn insures accurate location of the card to be read under the reading station 24.

In order to prevent a card from being read except when it is in accurate reading relationship with the reading station 24, conventional monitoring means, operatively associated with the reading station 24, are provided. The monitoring means (not shown) may include light-responsive means directed at the leading and trailing edges of the card being read at the reading station 24. Only when the card is in proper registration for reading does the monitoring means issue a "clear" signal to a computer (with which the card feed mechanism 20 may be used). Upon receiving said "clear" signal, the computer 195 (FIG. 10), through conventional logic circuitry operatively connected with the monitoring means, issues the necessary read signal to the card feed mechanism 20 to read the card positioned at the reading station 24 and then repeat the feeding operation, as previously explained.

Should one of the cards being fed become jammed in the card feed mechanism, conventional jam detection circuits (not shown) are provided in the control circuitry 194 (FIG. 10) to cut off the supply of current to the drive motor 180 and prevent another card from being fed until the jam is eliminated. The jam detection in the embodiment shown is obtained by an absence of the termination pulse (within an allotted time) from the generator 184 during its velocity sensing functions. For example, if a jam occurred when the forward drive current was on, the motor 180 would be prevented from accelerating the generator 194 to the speed required to generate the necessary termination pulse to initiate the current reversal to brake the motor. With an absence of the termination pulse, the forward drive current to the motor 180 would remain on and possibly damage the motor because of its being prevented from rotating by the card jam. To protect the motor 180 from such a dangerous situation, the drive current to the motor is shut off by the jam detection circuit if the motor does not reach a predetermined speed within an allotted time. A similar jam detection circuit is included in the control circuitry 194 to prevent damage to the motor 180 during the braking thereof.

To minimize the frictional loading on the feed band 36 due to varying amounts of cards being present in the feed hopper 22, a conventional two-stage hopper (not shown) may be provided in place of the hopper 22. With a two-stage hopper, the bulk of the cards to be fed are placed in a storage hopper and are fed therefrom to a feed hopper (like the hopper 22) positioned directly above the feed band 36 as needed by the card feed mechanism 20. The level of cards in the feed hopper is kept fairly constant by card-level-sensing means therein to provide a more even frictional loading on the feed band 36 than is possible with only one hopper 22, as shown in FIG. 1. The last-named sensing means actuate a card transfer mechanism to feed cards from the storage hopper to the feed hopper as required, and deactivate said mechanism when a predetermined level of cards is transferred to said feed hopper.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an apparatus of the type described:
   a frame means;
   hopper means secured to said frame means and adapted to hold a plurality of sheets in stacked relation, said sheets containing data in the form of light-transmitting areas;
   endless belt means having a plurality of equally spaced picker means thereon and adapted to successively pick one sheet from said hopper means as said belt means is moved therepast;
   said belt means being adapted to permit the passage of light therethrough;
   means for movably supporting said belt means on said frame means;
   a reading station secured to said frame means; and
   drive means operatively connected to said belt means and adapted to intermittently drive said belt means so as to pick one sheet from said hopper means and move it at varying velocities to said reading station, where said belt means is stopped so as to position said one sheet in reading relationship with said reading station;
   said reading station comprising a light source and light responsive means positioned on opposed sides of said endless belt means, said light source being adapted to be energized when said belt means and said one sheet being read are stopped momentarily under said reading station, light from said source passing through said belt means and said transmitting areas in said last-named sheet to said light responsive means; and
   means for receiving said sheets after they have been read at said reading station.

2. The apparatus as claimed in claim 1 in which said means for movably supporting said belt means comprises two stationary cylindrical support means secured to said frame means and having mounting centers spaced apart to receive said reading station and hopper means therebetween;

said belt means being mounted on said cylindrical support means to slide thereover and having equally spaced driving sprocket holes along opposed lateral edges thereof; and said drive means including driving sprocket means rotatably mounted in one of said cylindrical support means and in driving engagement with said procket holes.

3. The apparatus as claimed in claim 2 in which said belt means is made of a flexible transparent material and in which said picker means are identical planar picker blades which are secured to said transparent material and are spaced apart a distance to receive the width of one of said sheets between adjacent ones of said planar blades.

4. The apparatus as claimed in claim 2 in which said belt means is composed of a plurality of sections of opaque flexible material which approximate in size the said sheets to be carried thereby;

each said section having an array of light-transmitting areas therein which array provides one such area for each corresponding said area appearing in said sheets;

said picker means performing the dual function of joining said sections and also picking sheets from said hopper means;

said picker means comprising a plurality of planar picker blades, each of which is joined to two adjacent said sections to form said endless belt means, said picker blades being identical in size and spaced apart to receive the width of one of said sheets between adjacent ones of said picker blades; and said picker blades having a thickness which is less than the thickness of one of said sheets so that only one of said sheets will be removed from said hopper means as each said picker blade moves therepast.

5. The apparatus as claimed in claim 2 in which said frame means comprises a feed table over which said belt means slides with said belt means adapted to pass between the discharge end of said hopper means and said feed table;

said feed table having at least one groove in that surface thereof which engages said belt means with said groove being near said hopper means and also with said feed table having a passage means communicating with said one groove and adapted to be connected to a source of vacuum;

said one groove also being positioned relative to said belt means so as to be in substantial alignment with said sprocket holes to thereby assist in the transfer of said sheets from said hopper means to said belt means when said passage means is connected to said source of vacuum.

6. The apparatus as claimed in claim 5 in which said one groove is located in said feed table so as to be between the said lateral edges of said belt means when it passes thereover, and in which said endless belt means and picker means are made of steel which has a thickness which is less than that of any one of said sheets.

7. The apparatus as claimed in claim 2 in which said drive means comprises a printed circuit motor means whose output member is connected to said driving sprocket means.

8. The apparatus as claimed in claim 2 in which said reading station is spaced from said hopper means along the direction of movement of said belt means and is spaced from said hopper means a distance which enables the said sheet which is withdrawn from said hopper means to be positioned at said reading station upon the termination of the movement of the belt means which withdraws the last-named sheet from said hopper means.

9. The apparatus as claimed in claim 8 further comprising means for maintaining alignment of said sheets at said reading station in a direction which is transverse to the length of said belt means.

10. In an apparatus of the type described:

frame means comprising a feed table having an opening therein;

one cylindrical member secured to each end of a pair of opposed ends of said feed table to provide a return path for an endless belt means;

an endless belt means positioned on said cylindrical members and feed table so as to be in sliding engagement therewith and having driving sprocket holes in opposed lateral edges thereof;

tensioning means for said endless belt means;

driving sprocket means rotatably mounted in one of said cylindrical members and adapted to engage said driving sprocket holes and drive said belt means;

said belt means having a plurality of equally spaced picker means thereon;

a hopper means secured to said frame means and adapted to hold a plurality of punched tabulating cards in stacked relation, said cards containing data in the form of punched holes and which hopper means is positioned in feeding relationship with said belt means;

said belt means being adapted to permit the passage of light therethrough, and said picker knives thereon being adapted to successively pick one card from said hopper means as said belt means moves therepast;

said picker means being spaced apart a distance to receive the width of said cards between adjacent ones of said picker means;

a reading station secured to said frame means and positioned in alignment with said opening in said feed table, which opening is spaced from said hopper means in the direction of movement of said belt means; and drive means including a printed circuit motor means operatively connected to said driving sprocket means and adapted to intermittently drive said belt means so as to pick one card from said hopper means and accelerate said belt means with said last-named card thereon from a zero velocity until said belt means reaches a predetermined velocity, and to decelerate said belt means until said belt means and last-named card thereon come to a momentary stop with said last-named card positioned in reading relationship with said reading station;

said reading station comprising a light source and light responsive means positioned on opposed sides of said endless belt means at said opening in said feed table, said light source being adapted to be energized when said belt means and said last-named card are momentarily stopped at said reading station;

light from said light source, when said light source is energized, passing through said opening in said feed table, through said belt means, and simultaneously through all said punched holes to said light responsive means; and means for receiving said last-named card after it has been read at said reading station upon the next succeeding movement of said belt means.

11. A card feeding mechanism comprising:

frame means;

hopper means secured to said frame means and adapted to hold a plurality of punched cards in stacked relation, said cards containing data in the form of punched holes;

endless belt means having a plurality of equally spaced picker means thereon;

support means for movably supporting said belt means on said frame means;

a reading station secured to said frame means;

said belt means being located relative to said hopper means so as to enable said picker means to successively pick one card from the output side of said hopper means as said belt means is moved therepast; and drive means operatively connected to said belt means and including:

driving sprocket means operatively connected with said belt means to move said belt means on said support means;

printed circuit motor means mounted in said frame means and having an output shaft which is driven in one direction and at least partially braked by said printed circuit motor means to provide incremental driving thereof;

coupler means connecting said output shaft and said driving sprocket means, and having at least one positioning detent on the periphery thereof; and pawl means operative in response to said drive means and adapted to be selectively positioned in the path of said detent so as to stop said coupler means after said output shaft is partially braked and thereby stop said belt means to position said card carired thereby at said read station, where the data in said card is read.

No references cited.

DARYL W. COOK, Primary Examiner

U.S. Cl. X.R.

271—6